United States Patent [19]

Zicaro

[11] Patent Number: 4,856,561
[45] Date of Patent: Aug. 15, 1989

[54] SEAL CONSTRUCTION FOR BELL AND SPIGOT PIPE

[75] Inventor: Joseph P. Zicaro, Corona, Calif.

[73] Assignee: Hydro Conduit Corporation, Corona, Calif.

[21] Appl. No.: 119,143

[22] Filed: Nov. 10, 1987

[51] Int. Cl.$^4$ .......................... F16L 9/18; F16L 21/02
[52] U.S. Cl. .................................. 138/109; 138/155; 277/207 A; 285/379
[58] Field of Search ....................... 138/109, 155, 120; 277/1, 207 A; 285/379

[56] References Cited

U.S. PATENT DOCUMENTS

| | | | |
|---|---|---|---|
| 2,230,725 | 2/1941 | Nathan | 277/207 A |
| 3,135,519 | 6/1964 | Ligon et al. | 277/207 A |
| 3,173,694 | 3/1965 | Nathan | 277/1 |
| 3,544,119 | 12/1970 | Glover | 277/207 A |
| 4,344,461 | 8/1982 | Beune et al. | 138/109 |
| 4,487,421 | 12/1984 | Housas et al. | 277/207 A |

FOREIGN PATENT DOCUMENTS 1578743  11/1980  United Kingdom ........... 277/207 A

*Primary Examiner*—James E. Bryant, III
*Attorney, Agent, or Firm*—Gordon L. Peterson; Loyal M. Hanson

[57] ABSTRACT

A section of pipe includes a first body of material disposed in a bell and spigot pipe configuration having a bell portion extending to a bell end, which bell portion defines a radially inwardly facing annular seal groove in which to place a sealing ring to be engaged by a spigot portion of another section of pipe inserted into the bell portion. The seal groove is disposed between first, second, and third circumferentially-extending surfaces, the first surface facing radially inwardly and extending axially between the second and third surfaces, the second surface facing axially toward the bell end and extending radially inwardly from the first surface, and the third surface facing axially away from the bell end and extending radially inwardly from the first surface on an inclined away from the bell end as it extends from the first surface. The third surface engages an inclined third annular surface of a mating sealing ring placed in the seal groove, to thereby inhibit sealing ring displacement by a spigot portion of another section of pipe that engages the sealing ring. One form of the sealing ring includes a fin portion that the spigot portion engages, and a space contiguous the fin portion for fin deformation without sealing ring displacement and development of excessive pressure on the bell portion.

1 Claim, 3 Drawing Sheets

SEAL CONSTRUCTION FOR BELL AND SPIGOT PIPE

BACKGROUND OF THE INVENTION

1. Technical Field

This invention relates generally to bell and spigot pipe, and more particularly to a new and improved seal construction for such a pipe.

2. Background Information

Bell and spigot pipe is fabricated in generally rigid, cylindrically shaped sections. A bell portion of a section flares outwardly to the bell end in a bell shape, while a spigot end remains relatively straight in a configuration adapted to be inserted into the bell portion of another section to form a joint. Construction crews can join practically any number of sections in this way, and they often do so with large sections composed of pipe materials such as concrete, plastics, asbestos cement, steel, cast iron, or ceramics and the like, to construct any of various types of pipelines, such as those used in water supply, sewage systems, and drainage systems.

However, such pipelines often require adequately sealed joints between adjoining pipe sections, and existing bell and spigot pipe has certain drawbacks in this respect that need to be overcome. For example, some existing seal constructions employ a bell portion that is cast over part of an annular gasket or sealing ring so that the bell portion is formed with the sealing ring embedded in place, facing radially inwardly. When the spigot portion of another section is inserted in the bell portion, it bears against the sealing ring in sealing engagement.

This technique produces a sealing ring that is permanently affixed to the pipe section at the time of fabrication. One reason for doing this is that the sealing ring may otherwise become dislodged from or displaced as the spigot portion is inserted. In other words, as the spigot portion bears against the sealing ring, the sealing ring may loop or roll out of proper alignment, and the permanently affixed sealing ring is intended to overcome this problem. However, existing methods of fabricating a permanently affixed sealing ring may require complicated casting forms with components that can not be reused. Thus, the fabrication is more costly and inconvenient. Consequently, it is desirable to have a seal construction that overcomes this concern.

In addition, a permanently affixed sealing ring may deteriorate prior to use when the pipe section is stored in an unregulated environment, such as out of doors, from exposure to sun, ozone, and other environmental conditions. Since such a sealing ring is not conveniently replaced, the whole section of pipe may have to be replaced. Consequently, it is desirable to have a new and improved seal construction that overcomes this concern also.

Furthermore, the pressure distribution created as the spigot portion is forced into the bell portion against the sealing ring sometimes results in the bell portion fracturing. When the fracture is noticed, the section of pipe must be replaced. When unnoticed, a leaky joint may result, and this may occur long after construction has been completed to further compound the cost of remedial action. Consequently, it is desirable to have a new and improved seal construction that reduces the forces acting on the bell to thereby reduce the occurrences of bell fracturing, and it is desirable to do so with a seal construction fabrication method that is more convenient and less costly to perform.

SUMMARY OF THE INVENTION

This invention recognizes the problems associated with the prior art and provides a new and improved seal construction for bell and spigot pipe with the desired attributes.

Briefly, the above and further objects of the present invention are realized by providing a seal groove in the bell portion and a sealing ring with a mating inclined surface. The two surfaces cooperate to lock the sealing ring in position within the seal groove. This relieves fabrication problems. It inhibits sealing ring displacement and bell fractures during spigot insertion. It enables sealing ring installation at the time of use, and it produces a superior seal.

Generally, a section of pipe constructed according to the invention includes a first body of material disposed in a bell and spigot pipe configuration. This configuration has a bell portion extending to a bell end such that the bell portion has a size and shape adapted to receive a spigot portion of another section of pipe.

The bell portion defines a radially inwardly facing annular seal groove. The seal groove is used to receive a sealing ring. When a spigot portion of another section of pipe is inserted into the bell portion, it engages the sealing ring to produce a sealed joint.

The bell portion has first, second, and third circumferentially-extending surfaces between which the seal groove is disposed. The first surface faces generally radially inwardly and extends axially between the second and third surfaces. The second surface faces generally axially toward the bell end and extends generally radially inwardly from the first surface, and the third surface faces generally axially away from the bell end and extends generally radially inwardly from the first surface.

According to one aspect of the invention, the third surface is inclined away from the bell end as it extends from the first surface, to thereby engage a sealing ring placed in the seal groove and inhibit sealing ring displacement by a spigot portion of another section of pipe that engages the sealing ring.

According to another aspect of the invention, there is provided a sealing ring for placement in the seal groove. The sealing ring includes a second body of material disposed in an annular ring having a size and shape adapted to be placed within the seal groove for sealing purposes, and the annular ring has first, second, and third annular surfaces adapted to face respective ones of the first, second, and third surfaces of the bell portion. Thus, the first annular surface faces generally radially outwardly to face the first surface of the bell portion, the second annular surface faces generally axially to face the second surface of the bell portion, and the third annular surface faces generally axially on an incline to face the third surface of the bell portion.

According to yet another aspect of the invention, there is provided a radially inwardly extending annular fin portion of the sealing ring. The fin portion has a leading surface that is inclined away from the third annular surface toward the second annular surface. The fin portion is engaged by a spigot portion of another section of pipe inserted into the bell portion, and an annular space in the sealing ring contiguous the annular fin portion, in a position generally opposite the leading surface, facilitates deformation of the fin portion when it is so engaged. This arrangement further inhibits sealing ring displacement from the seal groove, as well as inhibiting bell fracturing.

A method of fabricating a section of bell and spigot pipe embodying the invention includes stretching a resilient ring over an annular section of a bell forming ring about which the bell portion is formed. The resilient ring is used to form the seal groove in the bell portion, and for this purpose the ring has a cross sectional shape, when stretched, that generally matches the cross sectional shape of the seal groove to be formed. When the bell forming ring is removed, the resilient ring relaxes so that it tends to withdraw generally radially inwardly to allow easy removal from the inclined surface of the seal groove, and this greatly simplifies fabrication while providing a seal groove in which a sealing ring can be installed at a later time, such as at the time of use.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
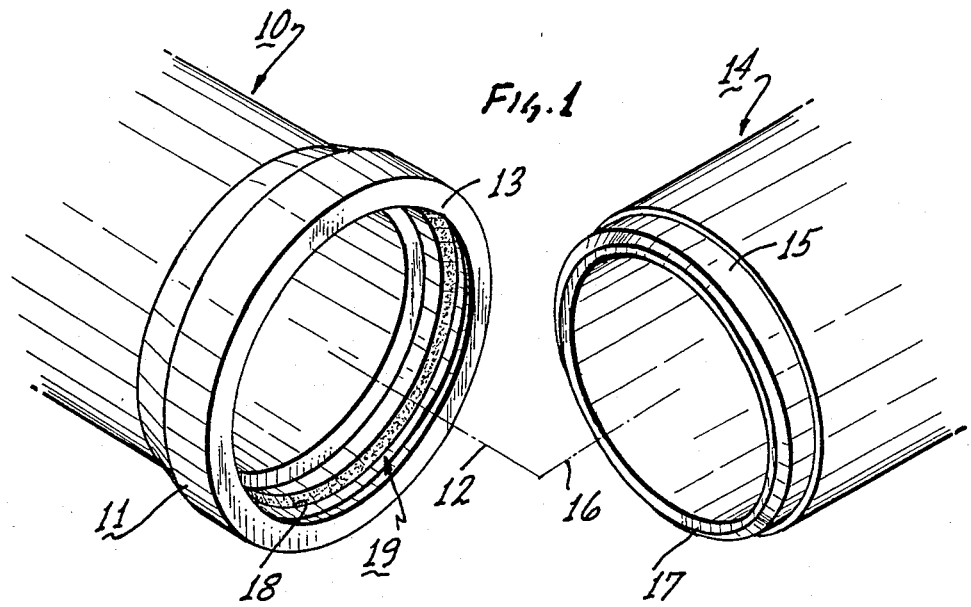
FIG. 1 of the drawings is a perspective view a section of bell and spigot pipe constructed according to the invention adjacent the spigot portion of another pipe section.

Referring now to FIG. 1, there is shown a portion of a first pipe section 10 constructed according to the invention that has a bell portion 11 extending along a first pipe axis 12 to a bell end 13. It is illustrated alongside a portion of a second pipe section 14 having a spigot portion 15 extending along a second pipe axis 16 to a spigot end 17. The sections 10 and 14 may be identical. The section 10 is composed of a body of cementitious material, such as concrete, and the section 14 may be composed of similar material. Of course, the sections 10 and 14 may be composed of other materials within the inventive concepts disclosed, such as plastics, asbestos cement, steel, cast iron, ceramics, and the like, and combinations thereof.

The body of material of which the section 10 is formed is disposed in a bell and spigot pipe configuration in the sense that it includes a bell or female end portion 11 extending to the bell end 13 that has a size and shape adapted to receive a spigot or male portion of another pipe section, such as the spigot portion 15. As used herein, bell end portion means any female end portion of a pipe section, and spigot end portion means any male portion of a pipe section. As such, these terms include, among other things, tongue and groove joints.

In this embodiment, the bell portion 11 flares outwardly to provide an enlarged cross sectional area adapted to receive the spigot portion 15. Of course, it is not necessary that the bell portion 11 flare outwardly. The section 10 includes an opposite end portion (not shown) that may be similar to the spigot portion 15 or otherwise shaped according to the specific pipe application. Similarly, the section 14 includes an opposite end portion (not shown) that may be similar to the bell portion 11 or otherwise shaped.

In addition, the bell end portion includes an annular seal groove 18 in which is disposed a seal or sealing ring 19. A joint is formed by installing the sealing ring 19 in the seal groove 18 as shown, aligning the first and second pipe axes 12 and 16, and inserting the spigot portion 15 into the bell end portion 11. When this is done, the spigot portion 14 engages the sealing ring 19 to seal the joint, and practically any number of sections can be joined in this manner to form a conduit of desired length.

Figure 2:
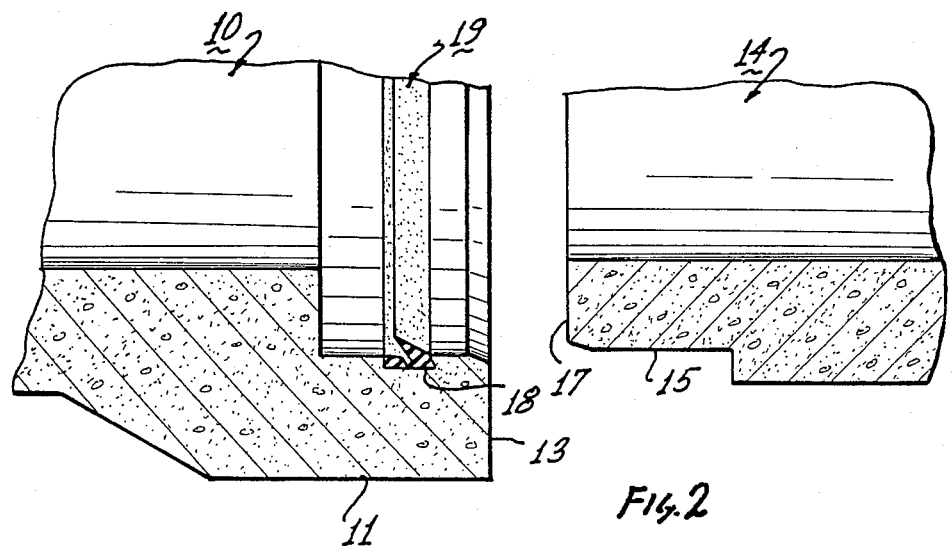
FIG. 2 is a cross sectional view of portions of the two sections showing the bell portion and the spigot portion aligned in position to be joined.
Figure 3:
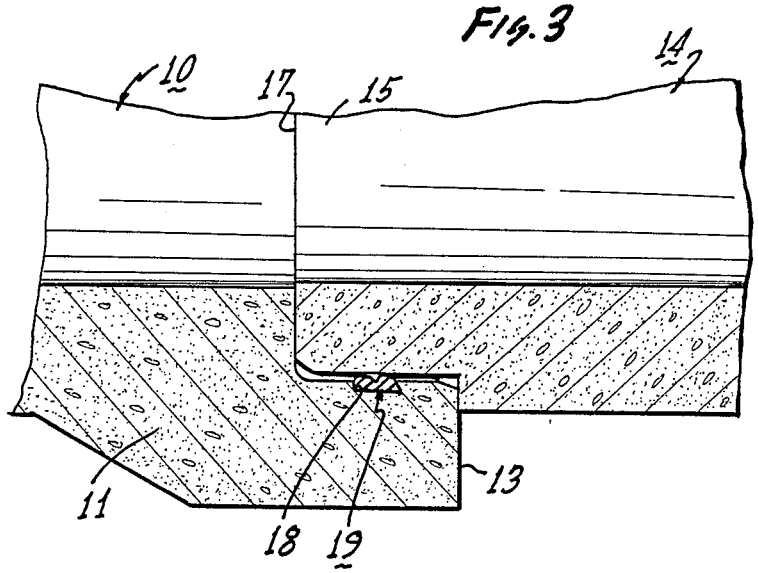
FIG. 3 is a cross sectional view of portions of the two sections showing the spigot portion inserted into the bell portion and engaging the sealing ring.

FIG. 2 illustrates the two sections 10 and 14 aligned in position to be joined in this manner, and FIG. 3 illustrates the spigot portion 15 inserted into the bell portion 11. When fully inserted, the spigot portion 15 engages the sealing ring 19, causing it to deform, and this produces a seal between the the spigot portion 15 and the bell portion 11.

Figure 4:
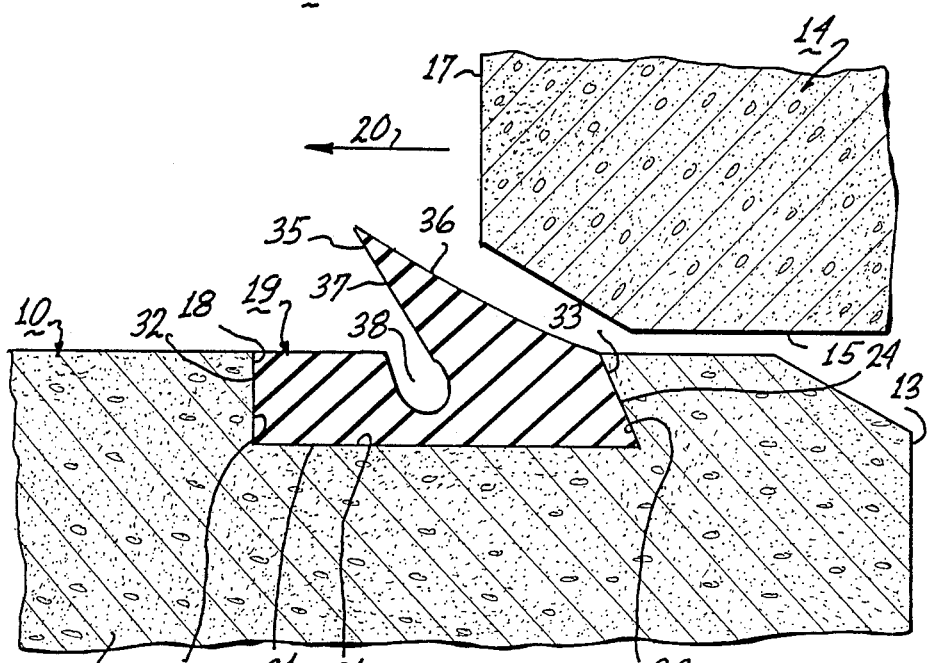
FIG. 4 is an enlarged diagrammatic view showing details of the seal groove and sealing ring in cross section.

Further details of the seal groove 18 and the sealing ring 19 are shown in FIG. 4, where the direction in which the spigot portion 15 is inserted is depicted by an arrow 20. The bell portion 11 has a plurality of first, second, and third circumferentially-extending surfaces between which the seal groove 18 is disposed. A first surface 21, which is cylindrical in this embodiment, faces generally radially inwardly and extends axially between a second surface or end wall 22 and a third surface or end wall 23. The second surface 22 faces generally axially toward the bell end 13 and extends generally radially inwardly from the first surface 21. The third surface 23 faces generally axially away from the bell end 13 and extends generally radially inwardly from the first surface 21.

In addition, a major portion of the third surface 23, and in this embodiment the entire third surface, is inclined away from the bell end 13 as the third surface 23 extends from the first surface 21. This arrangement results in the formation of a ledge 24 overhanging a part of the groove and the third surface 23 engaging the sealing ring 19 when it is placed in the seal groove 18. This locks the sealing ring 19 in place. In other words, it inhibits sealing ring displacement relative to the seal groove 18 by the spigot portion 15 when the spigot portion 15 engages and deforms the sealing ring 19 in the manner shown in FIG. 3.

The sealing ring 19 is a separate component fabricated according to known techniques from a second body of material to have an annular ring shape, with a size and shape adapted to be placed within the seal groove 18. This may be a resilient, deformable material suitable for sealing purposes, and the size may vary according to the size of the pipe. For a section of pipe having a bell portion of a given inside diameter, the sealing ring 19 has an approximately equal diameter so that it fits securely in the seal groove.

The annular ring shape in which the sealing ring 19 is disposed has a plurality of first, second, and third annular surfaces 31–33, adapted to face respective ones of the first, second and third surfaces 21–23 of the bell portion 11 when the sealing ring 19 is installed within the seal groove 18. This installation can be accomplished conveniently at the point of use to avoid seal deterioration prior to use.

The first annular surface 31 faces generally radially outwardly to face the first surface 21 of the bell portion 11. The second annular surface 32 faces generally axially to face the second surface 22 of the bell portion 11, and the third annular surface 33 faces generally axially on an incline to face the third surface 23 of the bell portion 11. Thus, the inclined third surface 23 of the bell portion 11 mates with the inclined third annular surface 33 of the sealing ring 19 so that the sealing ring 19 is locked in place within the seal groove 18. In other words, the mating surfaces 23 and 33 prevent the sealing ring 19 from looping or rolling out of the seal groove 18 when the spigot portion 15 engages the sealing ring 19, and although the sealing ring may also be retained with adhesive, this is ordinarily not necessary.

According to another aspect of the invention, the annular ring shape in which the sealing ring 19 is disposed includes a radially inwardly extending annular fin portion 35 that has a leading surface 36. The leading surface 36 is inclined away from the third annular surface 33 toward the second annular surface 32 as depicted in FIG. 4. Thus, the spigot portion 15 engages the leading surface 36, and the incline results in a radially outwardly directed component of force that deforms the fin portion 35 toward the first surface 21 of the bell portion 11, i.e. a rearward surface 37 of the fin portion 35 generally faces the first surface 21. This further inhibits looping or rolling.

In addition, the sealing ring 19 defines an annular space 38 contiguous the annular fin portion 35 in a position generally opposite the leading surface 36 as depicted in FIG. 4. The space 38 provides a relief. It facilitates deformation of the fin portion 35 toward the first surface 21 when the fin portion 35 is engaged by the spigot portion 15. This further inhibits looping or rolling, and also decreases the force transmitted to the bell portion 11 so that bell fracturing is significantly curtailed.

Figure 5:
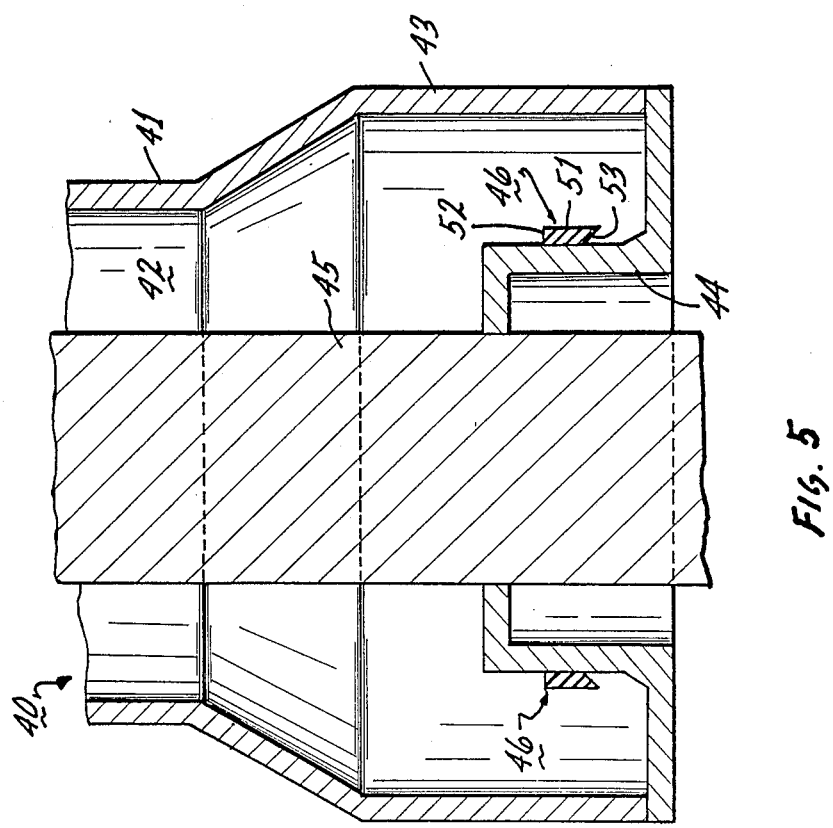
FIG. 5 is a diagrammatic elevational view taken in cross section of a portion of a casting form utilized to form the bell portion and seal groove.

Considering now FIG. 5, there is shown a portion of a casting form or mold 40 for fabricating the section 10. It includes a jacket 41 through which a passage 42 extends. A bell forming ring 43 includes an annular section 44 adjacent one end of the passage 42, and a core 45 extends generally axially in the passage 42.

A resilient ring 46 is stretched over the annular section 44 of the bell forming ring 43. The resilient ring 46 includes first, second, and third surfaces 51–53 that form the first, second, and third surfaces 21–23 of the bell portion 11. The first surface 51 extends axially to result in the first surface 21 of the bell portion 11. The second surface 52 extends radially to result in the second surface 22, and the third surface 53 extends on an incline to result in the third surface 23 of the bell portion 11.

A flowable cementitious or other hardenable material is introduced into the mold 40, and the mold 40 shapes the material into a bell and spigot pipe configuration while the resilient ring 46 shapes the seal groove 18 in the bell portion 11. Then the material hardens to form the section 10, as the resilient ring 46 forms the seal groove 18.

Once the material is hardened, the mold and the pipe section are separated, with the resilient ring 46 remaining with the pipe section. Then the resilient ring 46 is removed from the seal groove 18, the resilience of the resilient ring 46 biasing it radially inwardly out of the seal groove 18. By this method, the resilient ring 46 can be removed without damaging the ledge 24 and can be reused, and the sealing ring 19 can be installed at the time of use.

Figure 6:
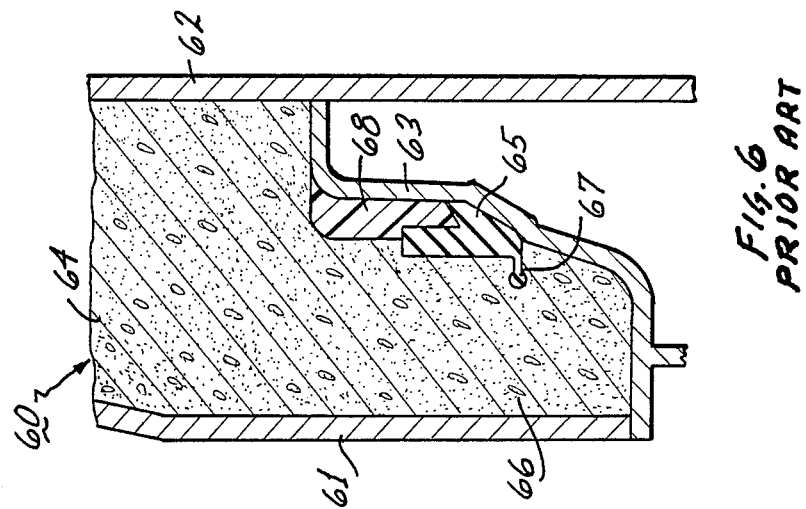
FIG. 6 is a diagrammatic elevational view taken in cross section of a prior art pipe section and casting form that results in a permanently affixed sealing ring.

A prior art mold 60 is illustrated in FIG. 6. It includes a jacket 61, a core 62, and a base annular section 63. These define a form into which a material 64 is introduced to form a pipe section. A sealing ring 65 encircles the annular section 63 in the mold 60, and it is cast into the bell portion 66 of the pipe section produced. A radially outwardly extending retainer portion 67 of the sealing ring 65 is provided to further permanently affix the sealing ring 65 to the bell portion 66.

In addition, a cellular plastic strip 68 is utilized to fill a space next to the sealing ring 65 until the pipe section is used, whereupon the plastic strip 68 is removed and discarded. Thus, fabrication in this manner is somewhat more involved, and requires more complicated equipment with components that are not reusable.

However, the new and improved seal construction of this invention overcomes these concerns. It relieves fabrication problems. It inhibits sealing ring displacement and bell fractures during spigot insertion. It enables sealing ring installation at the time of use, and it produces an excellent seal.

Although an exemplary embodiment of the invention has been shown and described, many changes, modifications, and substitutions may be made by one having ordinary skill in the art without necessarily departing from the spirit and scope of this invention.

What is claimed is:

1. An assembly comprising:
   a pipe section of cementitious material having an integral bell end portion adapted to receive a spigot portion of another pipe section;
   the bell portion terminating in a bell end having a radially inwardly facing seal groove;
   said groove having axially spaced end walls with at least a major portion of the end wall nearer the bell end being inclined away from the bell end as it extends radially inwardly to at least partially define a ledge overhanging a part of said groove;
   the other of said end walls extending substantially perpendicular to the longitudinal axis of the bell portion;
   said groove having an annular cylindrical wall extending between said end walls;
   a sealing ring in said groove and having a first annular surface facing generally radially outwardly to face the annular wall of the bell portion, a second annular surface extending radially and facing generally axially to face said other end wall of the bell portion, and an inclined annular surface facing the end wall nearer the bell end and interlocking therewith, said second annular surface and said inclined annular surface defining the opposite ends of the sealing ring and said first annular surface extending along the cylindrical wall from the second annular surface to the inclined annular surface;
   the sealing ring having an annular fin portion triangular in cross section which projects radially inwardly of the groove, the sealing ring having a leading surface contiguous with the apex of the triangular fin portion, the leading surface being inclined away from the bell end and extending radially inwardly; and the sealing ring having an annular space which opens radially inwardly contiguous the fin portion and remote from said apex, said annular space extending into said groove, said fin portion being between the leading surface and the annular space.

* * * * *